United States Patent [19]

Savu et al.

[11] Patent Number: 5,148,511
[45] Date of Patent: Sep. 15, 1992

[54] LOW REFRACTIVE INDEX PLASTICS FOR OPTICAL FIBER CLADDING

[75] Inventors: Patricia M. Savu, Maplewood, Minn.; Jerome W. McAllister, Hudson, Wis.

[73] Assignee: Minnesota Mining and Manufacturing Company, St. Paul, Minn.

[21] Appl. No.: 787,107

[22] Filed: Nov. 4, 1991

[51] Int. Cl.$^5$ .................................................. G02B 6/00
[52] U.S. Cl. ..................................... 385/145; 526/246
[58] Field of Search ....................... 385/141, 144, 145; 526/245; 430/321

[56] References Cited

U.S. PATENT DOCUMENTS

| | | | |
|---|---|---|---|
| 4,500,694 | 2/1985 | Ohmori et al. | 526/245 |
| 4,544,235 | 10/1985 | Nishida et al. | 350/96.34 |
| 4,968,116 | 11/1990 | Hulme-Lowe et al. | 350/96.3 |
| 5,062,680 | 11/1991 | Imamura et al. | 385/145 |

FOREIGN PATENT DOCUMENTS

| | | |
|---|---|---|
| 0250996A2 | 1/1988 | European Pat. Off. |
| 0256765A1 | 2/1988 | European Pat. Off. |
| 0357354A2 | 3/1990 | European Pat. Off. |
| 60-258218 | 12/1985 | Japan . |
| 62-208005 | 9/1987 | Japan . |

OTHER PUBLICATIONS

Groh, "Overtone absorption in macromolecules for polymer optical fibers," Makromol. Chem., 189, 2861–2874 (1988).
EIA/TIA Standard-FOTP-78-Spectral-Attenuation Cutback Measurement for Single-Mode Optical Fibers (EIA/TIA-455-78A), May.1990.

Primary Examiner—Frank Gonzalez
Assistant Examiner—John Ngo
Attorney, Agent, or Firm—Gary L. Griswold; Walter N. Kirn; Carolyn V. Peters

[57] ABSTRACT

A cladding composition comprising a fluorine-containing methacrylic monomer or a mixture of such monomers, and methyl methacrylate, such that the cladding composition is polymerized and then extruded or solution coated onto an optical fiber core, and an optical fiber comprising a core coated with such cladding composition, having a lower refractive index than the optical fiber core.

23 Claims, No Drawings

LOW REFRACTIVE INDEX PLASTICS FOR OPTICAL FIBER CLADDING

BACKGROUND OF THE INVENTION

1. Field of the Invention

This invention relates to optical fiber claddings and more particularly to optical fibers comprising extrudable or solution coatable low refractive index optical fiber cladding.

2. Description of the Related Art

Optical fibers have received widespread interest for information and data transfer. Fiber-guided modulated light beams are useful in many applications, for example, telecommunications, computer link-ups, and automotive controls. Advantageously, fiber optic linkages have a greater information carrying capacity as compared to metal wires carrying electrical signals. Furthermore, fiber optics are less likely to suffer from external interference, such as electromagnetic radiation.

Typically, optical fibers comprise a light carrying core, for example an inorganic glass such as fused silica or a polymer such as polymethyl methacrylate, and a cladding material having a lower refractive index than the core. The cladding material serves to confine the light energy within the core and thereby allows propagation of light by a phenomenon generally known as "total internal reflection."

Characteristically, glass optical fiber cores have very low optical loss and are generally preferred for long distance applications. On the other hand, the cost of connecting glass optical fiber cores tend to be cost prohibitive for short distance, connector intensive applications. Polymer fibers overcome the cost limitation for short distances. Furthermore, they are lighter weight, more flexible, and have a larger diameter than glass fibers. Although polymer fibers exhibit a greater optical loss than glass core fibers, they are preferred in shorter length applications. The most common commercial polymer optical fiber core material is polymethyl methacrylate (PMMA).

Transmission in optical fibers is typically improved by the use of a "cladding" having a lower refractive index to promote total internal reflection. Thus, the cladding acts like a mirror to keep the light in the fiber and reduces scattering losses of the optical fiber.

EPO 250,996 describes α- and β-fluorinated acrylates and methacrylates as cladding materials for glass core optical fibers.

EPO 256,765 describes α- and β-fluorinated acrylates and methacrylates as a cladding composition for polymer core optical fibers wherein the cladding composition comprises (a) ultraviolet ray-cured monofunctional acrylic or α-fluoroacrylic monomer, (b) a polyfunctional acrylate or α-fluoroacrylate having at least two acryloyl or α-fluoroacryloyl radicals in the molecule and (c) a photoinitiator. The cladding composition is first flow coated onto an optical fiber core and then ultraviolet ray-cured.

W. Groh, "Overtone Absorption in Macromolecules for Polymer Optical Fibers", Makromol. Chem., 189, 2861, 1988, a paper describing molecular bond absorption, concludes that perfluorinated polymers should show low optical loss.

Kokai No. JP60-258281 (English translation) describes optical lenses consisting of copolymers of at least one polymerizable compound containing polyfluoroalkyl methacrylates and non-fluorinated methacrylates.

Japanese Patent No. 62-208005 (English translation) describes optical fibers formed from polymers expressed by the general formula

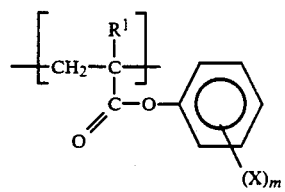

wherein $R^1$ is a hydrogen atom, or $C_{1-3}$ alkyl groups, X is a halogen atom and m is an integer of 1-5.

U.S. Pat. No. 4,500,694 (Ohmori et al.) describes optical fibers produced from fluoroalkyl acrylates and methacrylates with a fluorinated alkyl moiety of up to 3 carbon atoms, and copolymers of these fluoroalkyl groups with both fluorinated and non-fluorinated acrylates and methacrylates.

U.S. Pat. No. 4,544,235 (Nishida et al.) describes a plastic optical fiber having a cladding comprising a transparent copolymer comprising (1) about 20 to 99% by weight of a fluoroalkylacrylate, a fluoroalkylmethacrylate, or a mixture thereof, (2) 0.05 to 10% by weight of at least one hydrophilic radical and (3) optionally, 79.95% or less of at least one one vinyl monomer, different from comonomers (1) and (2).

U.S. Pat. No. 4,968,116 (Hulme-Lowe et al.) describes an optical fiber comprising a core coated with a cladding composition comprising a fluorinated monoacrylate, a polyfunctional cross-linking acrylate being difunctional or higher, and a photoinitiator.

SUMMARY OF THE INVENTION

Briefly, one aspect of the present invention provides extrudable or solution coatable low refractive index plastic cladding wherein the cladding is polymerized from monomers comprising:

(a) about 10% to 80% by weight of polymerizable fluorine-containing methacrylic monomer (A) or a mixture of polymerization fluorine-containing methacrylic monomer (A) and fluorine-containing methacrylic monomer (B), wherein monomer (A) can be represented by the formula

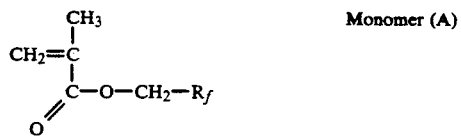

Monomer (A)

wherein $R_f$ is a perfluorocycloaliphatic or a perfluoroalkoxy group, having at least 6 carbon atoms and at least 11 fluorine atoms, and $R_f$ indicates that the group is fully fluorinated, that is, all hydrogen atoms in the group are substituted with fluorine atoms, and monomer (B), if present, is present in an amount of up to 50% by weight of the mixture and can be represented by the formula

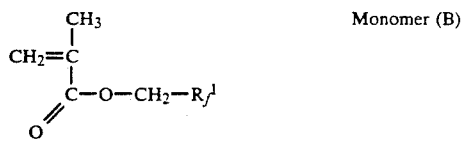

Monomer (B)

wherein $R^1_f$ is a perfluoroaliphatic or perfluoroalkoxy group, having at least 6 carbon atoms and at least 11 fluorine atoms, and $R^1_f$ indicates that the group is fully fluorinated, that is, all hydrogen atoms in the group are substituted with fluorine atoms;

(b) about 20% to 90% by weight of methyl methacrylate.

A cladding copolymer or terpolymer of the present invention can generally be represented by the following formula:

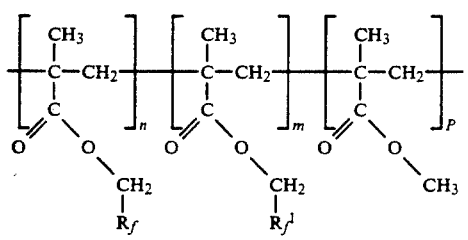

wherein $R_f$ and $R^1_f$ is as described above, m=0 to 70% by weight, n=10 to 80% by weight, and p=20 to 90% by weight, such that (n+m)=10 to 80% by weight.

In another aspect of the present invention, an optical fiber is provided comprising a core clad with a cladding composition having a lower refractive index than the core, the cladding composition comprising a fluorine-containing methacrylic monomer or a mixture of such monomers, and methyl methacrylate, such that the cladding composition is polymerized and then extruded or solution coated onto an optical fiber core.

The present invention provides superior alternative formulations for polymer optical fibers.

In this application:

"α-fluorination" means the main chain of the polymer is fluorinated;

"β-fluorination" means the side chain of the polymer is fluorinated;

"PMMA" means polymethyl methacrylate;

"PcHMA" means 1,1-dihydroperfluorocyclohexylmethyl methacrylate;

"FOMA" means 1,1-dihydroperfluorooctyl methacrylate;

"433MA" means 1,1-dihydroperfluorobutoxyisoproxyisopropyl methacrylate;

"433MA" means 1,1-dihydroperflurobutoxyisopropoxyisopropoxyisopropyl methacrylate; and "733MA" means perflurocyclohexylmethoxy-2-propoxy-1,1-dihydro-2-propyl methacrylate.

DESCRIPTION OF THE INVENTION

More specifically, the present invention describes a plastic optical fiber cladding composition wherein the cladding composition is polymerized from monomers comprising:

(a) about 10% to 80% by weight of polymerizable fluorine-containing methacrylic monomer (A) or a mixture of polymerization fluorine-containing methacrylic monomer (A) and fluorine-containing methacrylic monomer (B), wherein monomer (A) can be represented by the formula

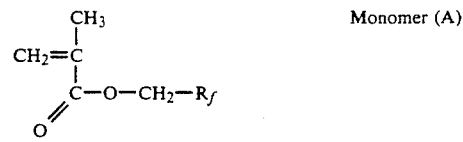

Monomer (A)

wherein $R_f$ is a perfluorocycloaliphatic or a perfluoroalkoxy group, having at least 6 carbon atoms and at least 11 fluorine atoms, and $R_f$ indicates that the group is fully fluorinated, that is, all hydrogen atoms in the group are substituted with fluorine atoms, and monomer (B), if present, is present in an amount of up to 50% by weight of the mixture and can be represented by the formula

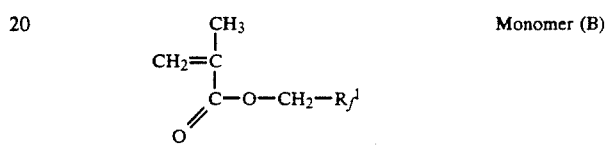

Monomer (B)

wherein $R^1_f$ is a perfluoroaliphatic, perfluorocycloaliphatic or perfluoroalkoxy group, having at least 6 carbon atoms and at least 11 fluorine atoms, and $R^1_f$ indicates that the group is fully fluorinated, that is, all hydrogen atoms in the group are substituted with fluorine atoms;

(b) about 20% to 90% by weight of methyl methacrylate.

A cladding copolymer or terpolymer of the present invention can generally be represented by the following formula:

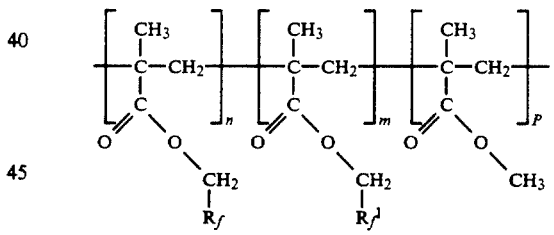

wherein $R_f$ and $R^1_f$ is as described above, m=0 to 70% by weight, n=10 to 80% by weight, and p=20 to 90% by weight, such that (n+m)=10 to 80% by weight.

The present invention satisfies the need for optical fiber claddings having a low refractive index. Thus, the copolymers or terpolymers provide an extrudable or solution coated cladding having a $T_g$ greater than 50° C., and a refractive index in the range of 1.37 to 1.47.

Advantageously, incorporation of 10% by weight or more of the fluorinated monomer unit lowers the refractive index of the cladding terpolymer. The use of relatively high molar concentrations of methyl methacrylate allows the resulting cladding terpolymers to exhibit higher softening temperatures, good melt processing characteristics, and improved flexibility over fluoro(meth)acrylate homopolymers. These characteristics provide a cladding for optical fibers with improved optical clarity, reduced refractive index, and good melt processing. Furthermore, molar concentrations of methyl methacrylate in the range of 20 to 90% by weight typically provides cost efficiency in the production of the cladding polymer, as well as optical fibers derived therefrom.

The cladding copolymers or terpolymers of the present invention can be prepared using any conventional process or processes. A general process for preparing the cladding polymers of the present invention comprise the steps:

(a) admixing a polymerizable mixture comprising 10% to 80% by weight, preferably 40% to 70% by weight of a fluorine-containing monomer (A) or a mixture of fluorine containing monomer (A) and fluorine-containing monomer (B) wherein monomer (A) has the formula

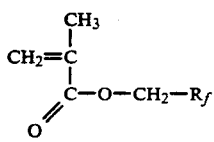

wherein $R_f$ is a perfluorocycloaliphatic or perfluoroalkoxy group, having at least 6 carbon atoms and at least 11 fluorine atoms, and $R_f$ indicates that the group is fully fluorinated, that is, all hydrogen atoms in the group are substituted with fluorine atoms, and wherein monomer (b) has the formula

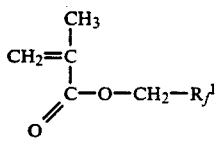

wherein $R^1_f$ is a perfluoroaliphatic, perfluorocycloaliphatic or perfluoroalkoxy group, having at least 6 carbon atoms and at least 11 fluorine atoms, and $R^1_f$ indicates that the group is fully fluorinated, that is, all hydrogen atoms in the group are subsituted with fluorine atoms, with 20% to 90% by weight, preferably 40% to 70% by weight of methyl methacrylate, and about 0.5% to 3.0% by weight, preferably 1.0 to 2.5% by weight of a free radical initiator;

(b) dissolving the polymerizable mixture in a suitable solvent such as ethyl acetate, or Freon ™ 113 at 5–50% by weight, preferably 15–33% by weight;

(c) degassing the polymerizable mixture;

(d) elevating the temperature of the polymerizable mixture and polymerizing the polymerizable mixture;

(e) removing the solvent and residual monomers by a preliminary drying in an oven at atmospheric pressure;

(f) grinding the polymer to increase the surface area and release additional monomer and solvent trapped in the polymer;

(g) final drying of the polymer in a vacuum oven;

(h) grinding the polymer; and (i) extruding or solvent casting the polymer onto a plastic optical fiber as a sheath or cladding.

Suitable free-radical initiators that are useful in the present invention include, for example, azo initiators, such as, azo bis-iso-butyronitrile, and azo t-butane; peroxides, such as, t-butyl hydroperoxide and di-t-butyl peroxide; or any other free radical initiator that is known to those skilled in the art.

Suitable adhesion promoters, such as hydrophilic vinyl monomers may be incorporated into the cladding of the present invention to promote adhesion between the core fiber and the cladding. Suitable monomers include for example, (meth)acrylic acid at a range of 0.5% to 3.0% by weight. Other adhesion promoters include those described in U.S. Pat. No. 4,544,235 and such description is incorporated herein by reference.

In general, a preferred embodiment of plastic cladding polymers of the present invention have the following formulation:

(a) 10–80% by weight, preferably 30–60% by weight, of 1,1-dihydroperfluorobutoxyisoproxyisopropyl methacrylate;

(b) 20–90% by weight, preferably 40–70% by weight of a methyl methacrylate;

(c) 1.0–3.0% by weight, preferably 1.5–2.0% by weight of a free radical initiator; and (d) 0–3.0% by weight, preferably 0.5–2.0% by weight of an adhesion promoter.

The plastic cladding polymers of the present invention can be coated over a number of fiber optical cores, such as poymethylmethacrylate, polystytrene, polycarbonate, glass, amorphous polyolefins, or polyfluoroacrylics such as described in co-pending U.S. Patent Application, Ser. No. 07/741960, filed Aug. 8, 1991, entitled "Fluorine-Containing Plastic Optical Fiber Cores", McAllister et al. provided the fiber optical core has a refractive index of least 0.01 greater than that of the cladding.

The optical fibers prepared using the plastic cladding polymers of the present invention may also be coated with a protective coating over the polymeric cladding, as is known in the art. See, for example, U.S. Pat. No. 4,968,116, wherein a protective coating of tetrafluoroethylene, may be extrusion coated by passing the clad fiber through a melt of the fluoropolymer. A suitable fluoropolymer is commercially available from DuPont under the tradename Tefzel 210.

Objects and advantages of this invention are further illustrated by the following examples, but the particular materials, amounts thereof and processes recited in these examples, as well as other conditions and details, should not be construed to unduly limit this invention. In the examples, all parts are parts by weight unless otherwise indicated. Molecular weight and polydispersity were measured by gel permeation chromatography (Hewlett Packard 1084 GPC/LC). Plastic optical fiber cores clad with the polymers of the present invention were analyzed for optical attenuation at 633 nanometers using the fiber-cut back procedure described in FOTP-78 (ANSI/EIA/TIA Standard, Spectral-Attenuation Cutback Measurements for Single-Mode Optical Fibers, EIA/TIA-455-78A, May 1990).

All starting materials were available from Aldrich Chemical Co., unless otherwise stated or apparent.

To evaluate the mechanical properties of the copolymers and terpolymers of the present invention, it was necessary to draw the polymers into a small diameter fiber. Under normal use circumstances, the polymers are extruded over an optical fiber core according to general extrusion cladding procedures known to those skilled in the art. The optical fibers prepared using the plastic cladding of the present invention were prepared by coextruding using two identical Model 254 extruders having a 1.5 cm diameter by 37.5 cm length (available from Haake-Buchler, Saddle Brook, NJ). The optical fiber cores were Plexiglas ™ Acrylic Resin (Grade VLD, available from Rohm & Haas, Philadelphia, PA).

Alternatively, the polymers can be solution coated on an optical fiber core according to general solution cladding procedures, such as described in EPO 0 357 354. For example, the optical fibers may be prepared by first melt forming the core and subsequently applying the present invention by dissolving the cladding polymer in a solvent and then immersing the core in the resulting solution to coat the core's surface.

EXAMPLES

Preparation Example 1

Preparation of 1,1-dihydroperfluorocyclohexylmethyl methacrylate-PcHMA

An admixture of 336 grams of trifluoroacetic anhydride and 0.4 gram of phenothiazine was added to a two liter flask, fitted with an overhead stirrer, dropping funnel, and thermometer. The flask was cooled to 5° C. Over a 40 minutes period and under continuous stirring, 15 grams of methacrylic acid was added to the flask. The reaction mixture was stirred for an additional 30 minutes at a temperature of 5° C. Over a 30 minute period, 400 grams of perfluorocyclohexylmethylol (3M Co.) was slowly added to the reaction mixture, such that the temperature of the reaction mixture did not exceed 20° C. The reaction was then stirred overnight. The reaction mixture was poured into 400 ml of water and the lower phase containing the fluorochemical product was removed. The crude fluorochemical product was washed with 400 ml of water, 200 ml of 9% NaOH, 200 ml of 1% $H_2SO_4$. A total of 450 grams of washed crude fluorochemical product was isolated. The crude fluorochemical product was then distilled at 0.59 kPa vacuum at a head temperature of 60°–65° C. to produce 406 grams of the desired product.

Preparation Example 2

Preparation of 1,1-dihydroperfluorooctyl methacrylate-FOMA

An admixture of 328 grams of trifluoroacetic anhydride and 0.3 gram of phenothiazine was added to a three liter flask, fitted with an overhead stirrer, dropping funnel, and thermometer. The reaction flask was cooled to 5° C. Over a 40 minute period, 148 grams of methacrylic acid was added to the vigorously stirred reaction mixture. The reaction mixture was stirred for an additional 30 minutes at a temperature of 10° C. Then, 500 grams of 1,1-dihydrofluorooctanol (3M Co.) was slowly added over a 30 minute period, such that the temperature of the reaction mixture did not exceed 20° C. The reaction mixture was then stirred overnight. The reaction mixture was then poured into 700 ml of water and the lower phase containing the fluorochemical product was removed. The crude fluorochemical product was water with an additional 700 ml of water, 700 ml of 0.2% NaCl, 700 ml of 1% NaCl. The crude fluorochemical product was then distilled at 1.2 kPa of vacuum at a head temperature of 70°–70° C. to produce 495 grams of methacrylate product.

Preparation Example 3

Preparation of 1,1-dihydroperfluorobutoxyisoproxyisopropyl methacrylate-433MA

An admixture of 78 grams of methacrylic anhydride, 0.5 gram of phenothiazine, and 11 drops of 12% fuming sulfuric acid was added to a one liter flask, fitted with an overhead stirrer, dropping funnel, and thermometer. A fluorinated alcohol mixture (200 grams) of 90 wt. % of 1,1-dihydroperfluorobutoxyisopropoxyisopropanol and 10 wt. % of 1,1-dihydroperfluorobutoxyisopropoxyisopropoxyisopropanol (3M Co.) was added to the reaction flask. The reaction mixture was heated to a temperature of 60°–70° C. for approximately 2 hours. The reaction mixture was cooled to room temperature and poured into 100 ml of water and the lower phase containing crude fluorochemical product was removed. The crude fluorochemical product was then washed with 265 ml of 9% KOH solution and 250 ml of water. The crude fluorochemical product was then distilled at 0.53 kPa vacuum to produce 200 grams of product, distilling at 75°–85° C.

Preparation Example 4

Preparation of 1,1-dihyroperfluorocyclohexylmethoxyisoproylisopropyl methacrylate-733MA An admixture of 25 grams of methacrylic anhydride, 0.2 gram of phenothiazine and 3 drops of 1% fuming sulfuric acid was added to a one liter flask, fitted with an overhead stirrer, dropping funnel, and a thermometer. A fluorinated alcohol mixture (88 gramsa) of 75 weight % of 1,1-dihydroperfluorobutoxyisoproxyisopropanol and 25 weight % of coreesponding aldehyde was added to the reaction mixture. The mixture was then heated to 60°–70° C. for two hours. The reaction was cooled to room temperature and poured into 100 ml of water and the lower phase containing crude fluorinated product was removed. The crude fluorinated product was then washed with 100 ml of 9% KOH solution and another 50 ml of water. The crude product was then fractionally distill through a three plate Snyder column (bubblepack) at 0.3 mm to give 66 grams of product, distilling in the range of 88°–92° C.

EXAMPLE 1

A low refractive plastic cladding comprising 50:50% by weight of 1,1-dihydroperfluorocyclohexylmethyl methacrylate and methyl methacrylate copolymer was prepared as follows:

A polymerization mixture was prepared by admixing 5.0 grams of 1,1-dihydroperfluorocyclohexylmethyl methacrylate monomer (as prepared in Preparation Example 1), 5.0 grams of methyl methacrylate monomer (as prepared in Preparation Example 3), and 0.1 gram of asobisisobutryonitrile (AIBN, commercially available under the trade designation "VAZO 65") in 57 grams of Freon ™ 113. The polymerization mixture was agitated for 18 hours at 65° C. At the end of that time, the polymerization mixture was poured out and dried for 8 hours at 110° C. The solid material was ground and dried further for 18 hours at a temperature of 110° C. and a pressure of 16.9 kPa. After 18 hours, the polymer was finely ground with a mortar and pestle. The $T_g$ was 108° C. (midpoint) by differential scanning calorimetry (DSC) (Perkin Elmer DSC 7). The ground polymer was extruded using a capillary rheometer. The material was easily drawn into a colorless, transparent fiber without bubbles. The drawn fiber has a refractive index of 1.45 that was measured using an Abbe Refractometer B (Zeiss, OberKocken, W. Germany).

EXAMPLE 2

A low refractive plastic cladding comprising 41:49:10% by weight of 1,1-dihydroperfluorocyclohexylmethyl methacrylate, methyl methacrylate, and 1,1- dihydroperfluoroctyl methacrylate copolymer was prepared as follows:

A polymerization mixture was prepared by admixing 4.1 grams of 1,1-dihydroperfluorocyclohexylmethyl methacrylate monomer (as prepared in Preparation Example 1), 4.9 grams of methyl methacrylate (Rohm & Haas Co.), 1.0 gram of 1,1-dihydroperfluorooctyl methacrylate (as prepared in Preparation Example 2), and 0.1 gram of AIBN in 57 grams of Freon TM 113. The polymerization mixture was agitated for 18 hours at 65° C. At the end of that time, the polymerization mixture was poured out and dried for 8 hours at 110° C. The dried material was ground and dried further for 18 hours at a temperature of 110° C. and a pressure of 16.9 kPa. After 18 hours, the polymer was ground with a mortar and pestle. The $T_g$ was 87° C. (midpoint) as determined by DSC. The ground polymer was extruded using a capillary rheometer. The material was easily drawn into a colorless, transparent fiber without bubbles. The drawn fiber has a refractive index of 1.419 as measured by an Abbe refractometer.

EXAMPLES 3-9

A series of fluoromonomer and methyl methacrylate copolymers were prepared using the procedure below. The respective amounts of fluoropolymer to methyl methacrylate, as well as the $T_g$, refractive index, elongation, tensile strength, mole average molecular weight ($M_n$), weight average molecular weight ($M_W$), and $M_W/M_n$ are summarized in Tables 2 and 3.

A polymerization mixture (10 grams total monomer) was prepared by admixing a fluoromonomer and methyl methacrylate in 57 grams of ethyl acetate. 0.1 gram of AIBN (alternatively, 0.2 gram of t-butyl peroctoate can be used) was then dissolved in the polymerization mixture. The mixture was agitated for 18 hours at 65° C. The mixture was then poured out and allowed to dry for 4 hours at 110° C. The dried material was ground, washed with 57 grams of reagent grade methanol, and dried for 4 hours at 110° C. The dried material was reground and further dried for 18 hours at a temperature of 120° C. and at a pressure of 16.9 kPa. The dried polymer was then ground in a mechanical grinder. The $T_g$ was then measured. The ground polymer was then extruded using a capillary rheometer. The materials were easily drawn into colorless, transparent fibers. Mechanical properties of the fibers were measured on an Instron Model 1122 with a 12.7 cm gap and a 1.3 cm.min crosshead speed (available from Instron Corp., Canton, MA).

TABLE 2

| Example | Composition of Copolymers (% by weight) | % Elongation | Tensile Strength (MPa) |
|---|---|---|---|
| C1 | MMA (100) | 20 | 55.2 |
| 3 | MMA:PcHMA (50:50) | 2 | 27.6 |
| 4 | MMA:FOMA (60:40) | 10-16 | 55.2 |
| 5 | MMA:433MA (60:40) | 22-27 | 31.0 |
| 6 | MMA:PcHMA:433MA (60:30:10) | 2 | 48.3 |
| 7 | MMA:PcHMA:433MA (60:20:20) | 15 | 41.4 |
| 8 | MMA:FOMA:433MA (60:20:20) | 20 | 41.4 |
| 9 | MMA:FOMA:433MA (60:10:30) | 18 | 48.3 |

TABLE 3

| Example | $M_n$ | $M_W$ | $M_W/M_n$ | $T_g$ (°C.) |
|---|---|---|---|---|
| C1 | | | | 105 |
| 3 | 16033 | 38599 | 2.4 | 108 |
| 4 | 28689 | 104625 | 3.6 | 98 |
| 5 | 21459 | 51435 | 2.4 | 92 |
| 6 | 16863 | 60674 | 3.6 | 102 |
| 7 | 22406 | 60354 | 2.7 | 100 |
| 8 | 19900 | 48158 | 2.42 | 96 |
| 9 | | | | 92 |

EXAMPLE 10

Three (3) kilograms of 50:50 MMA:PcHMA were prepared in five batches of solution polymer. The polymer was prepared at 15% solids in Freon TM 113 with 2 weight % of total monomer of AIBN at 65° C. Gel permeation chromatography (GPC) on the blend of the five batches showed ($M_n$)=8545 and molecular weight ($M_w$)=95132. Typical viscosity versus shear rate data for 50:50 MMA:PcHMA and Rohm & Hass PMMA Grade VLD are summarized below in Table 4. For effective core-sheath extrusion, it is preferable to match viscosity versus shear rate data, but it is also desirable to match processing temperatures.

For the extrusion run, both extruders were started up using VLD at a melt temperature of about 200° C. After an equilibrium was achieved, the sheath extruder was switched to 50:50 MMA:PcHMA, and both extruders were cooled until the melt temperature from both extruders was about 185° C. The 50:50 MMA:PcHMA processed with no apparent problems in feeding, melting or forming. The overall fiber diameter was about 0.76 mm with a 0.13 mm cladding. Both cladding and core were visually clear. At 633 nm, a loss value of 4.5 dB/m was measured.

TABLE 4

| VLD (190° C.) | | 50:50 MMA:PcHMA (173° C.) | |
|---|---|---|---|
| Shear Rate (sec$^{-1}$) | Viscosity (Pa.s) | Shear Rate (Sec$^{-1}$) | Viscosity (Pa.s) |
| 12 | 3828 | 12 | 4079 |
| 27 | 2776 | 29 | 2655 |
| 69 | 1978 | 69 | 1854 |
| 152 | 1283 | 138 | 1377 |
| 359 | 738 | 138 | 1377 |
| 875 | 411 | 277 | 1036 |

EXAMPLE 11

Two (2) kilograms of 60:40 MMA:433MA were prepared in seven batches of solution polymer. The polymer was prepared at 30% solids in ethyl acetate with 1.5 weight % of total monomer of t-butyl peroctoate at 70° C. The crude polymerization reaction was dried overnight at 110° C., then cooled, and mechanically ground. The ground polymer was dried overnight at a temperature of 120° C. and a pressure of 1.9 kPa. The dried ground polymer was then reground and dried overnight at a temperature of 140° C. and a pressure of 1.9 kPa. The dried polymer was reground for a second time. GPC on the blend of the seven batches showed $M_n=21785$ and $M_W=61000$. As a by-product of monomer synthesis, 433MA contained about 10% impurity of [CF$_3$(CF$_2$)$_3$O(CF(CF$_3$)CF$_2$O)$_2$CF(CF$_3$)C-H$_2$OCOC(CH$_3$)CH$_2$](433MA). The refractive index of the 60:40 MMA:433MA was found to be 1.4305. Evaluation results indicated that the physical properties of the cladding polymer were not affected by the presence of the impurity. Accordingly, the 2 kg extrusion batch contained MMA:433MA:4333MA (60:36:4). H$^1$ and F$^{19}$ NMR confirmed the composition of the extrusion batch.

Mechanical properties were measured on an Instron with a 13 cm gap and a 1.3 cm/min crosshead speed. The initial modulus was 2.4 GPa, the yield was 58.6 MPa at a 3.5% elongation, and the break was 66.9 MPa at a 12% elongation. At a processing temperature of 173° C., the batch showed a viscosity of 1500 Pa.s at a shear rate of 115 sec$^{-1}$. Prior to extruding the 433MA copolymer as a sheath onto Rohm & Haas VLD PMMA core, viscosity versus shear rate was measured at several temperatures for each polymer. The preferred viscosities for the two polymers were found at 173° C. for 433MA and 204° C. for the PMMA. The two temperatures were such that the viscosity was approximately 1500 Pa.s at a shear rate of 100 sec$^{-1}$, the preferred operating range of a single screw extruder. For bi-component extrusion, it is preferred that matching viscosities be selected such that a temperature difference of less than 25° C., although processing results indicate that a greater differential is not necessarily detrimental to the performance of the cladded optical fiber.

Co-extrusion was performed using two 1.5 cm diameter 25:1 extruders. Initially, the melt streams were at 204° C. for the core and 175° C. for the cladding sheath. The output was 10 grams/min for the core and 7 grams/min for the cladding sheath. The winder speed was set to provide a 0.91 mm total diameter with the core being about 0.76 mm in diameter. The sheath cladding was cloudy with some bubbles. The sheath cladding improved upon cooling the cladding melt by approximately 10° C. and reducing the sheath output by approximately 10%. The improvements produced a clear cladded core optical fiber.

The 433MA resin had good melt processing characteristics and was responsive to changes in extrusion conditions. Furthermore, the resin fed through the extruder well and drew into a uniform fiber without breaking or instabilities. The adhesive characteristic of the cladding to the core was sufficient, such that it did not delaminate when the fiber was flexed and bent around a small radius and it was not delaminated by abrasion. At 633 nm, a loss value of 1.4 dB/m was measured, using EIA/TIA Standard Spectral-Attenuation Cutback Measurement (FOTP-28).

EXAMPLE 12

A polymerization mixture was prepared by admixing 5.0 grams of perfluorocyclohexylmethyloxy-2-propoxy-1,1-dihydro-2-propyl methacrylate, 5.0 grams of methyl methacrylate, and 0.2 gram t-butyl peroctoate in 23 grams of ethyl acetate. The polymerization mixture was agitated for 18 hours at 70° C., after which the polymerization mixture was poured out and dried for 8 hours at 110° C. The solid material was ground and dried further for eighteen hours at a temperature of 110° C. and a pressure of 0.67 kPa. The polymer was then ground mechanically. The $T_g$ of the polymer was 101° C. (midpoint) as measured by DSC. GPC indicated the polymer had $M_n=14450$ and $M_w=34112$. The ground polymer was extruded using a capillary rheometer. The material was easily drawn into a colorless, transparent fiber without bubbles. The refractive index of the drawn fiber was measured using the Becke Line Method (Allen, *Practical Refractometry by Means of the Microscope*, Cargill Labs, 1985) and found to be 1.435. The mechanical properties of the fiber were measured on an Instron with a 13 cm gap and a 1.3 cm/min crosshead speed. The tensile strength at break was 48.3 MPa, elongation at break was 7%, and the initial modulus was 2.6 GPa. At a shear rate of 115 sec$^{-1}$, the viscosity was 1850 Pa.s.

EXAMPLES 13-15

A series of fluoropolymers comprising fluoromethacrylates, methyl methacrylates, and (meth)acrylic acid were prepared using the following procedure. The respective amounts of fluoromonomer to methyl methacrylate, as well as the physical and mechanical properties of the fluoropolymers are summarized in Tables 5 and 6.

A polymerization mixture (total weight of monomers was equal to 10 grams) was prepared by admixing a fluoromonomer, methyl methacrylate, and (meth)acrylic acid in 23 grams of ethyl acetate. The mixture was degassed under a nitrogen stream. 0.15 gram of t-butyl peroctoate was then dissolved into the polymerization mixture. The mixture was agitated for 18 hours at 70° C. The mixture was then poured out and allowed to dry for 4 hours at 110° C. The dried material was ground, washed with 57 grams of reagent grade isopropanol, and dried for 4 hours at 110° C. Then the dried material was reground, and further dried for 18 hours at 120° C. at 0.67 kPa. The dried polymer was then ground in a mechanical grinder. The $T_g$ and molecular weight were then measured. The ground polymer was then extruded using a capillary rheometer. The materials were easily drawn into colorless, transparent fibers. The mechanical properties of the fibers were measured on an Instron with a 12.7 cm gap and 1.3 cm·min$^{-1}$ crosshead speed. AA means acrylic acid and MA means methacrylic acid.

TABLE 5

| Example | Composition of Copolymers (% by weight) | % Elongation | Tensile Strength (MPa) |
| --- | --- | --- | --- |
| 13 | MMA:443MA:AA (39:60:1) | 21 | 79.9 |
| 14 | MMA:433MA:AA (38:60:2) | 19 | 66.2 |
| 15 | MMA:443MA:MA (38:60:2) | 17 | 98.9 |

TABLE 6

| Example | $M_n$ | $M_W$ | $M_W/M_n$ | $T_g$ (°C.) |
| --- | --- | --- | --- | --- |
| 13 | 19146 | 50362 | 2.63 | 94 |
| 14 | 19053 | 51822 | 2.71 | 96 |
| 15 | 20587 | 50418 | 2.45 | 93 |

Various modifications and alternations of this invention will be become apparent to those skilled in the art without departing from the scope and principles of this invention, and it should be understood that this invention is not to be unduly limited to the illustrative embodiments set forth hereinabove.

We claim

1. A cladding composition for optical fibers comprising:
(a) about 10% to 80% by weight of polymerizable fluorine-containing methacrylic monomer (A) or a mixture of polymerization fluorine-containing methacrylic monomer (A) and fluorine-containing methacrylic monomer (B), wherein monomer (A) can be represented by the formula

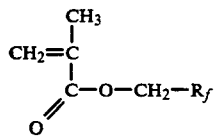 Monomer (A)

wherein $R_f$ is a perfluorocycloaliphatic or a perfluoroalkoxy group, having at least 6 carbon atoms and at least 11 fluorine atoms, and $R_f$ indicates that the group is fully fluorinated, that is, all hydrogen atoms in the group are substituted with fluorine atoms, and monomer (B), if present, is present in an amount of up to 50% by weight of the mixture and can be represented by the formula

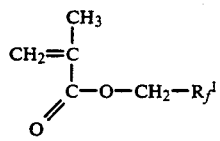 Monomer (B)

wherein $R^1_f$ is a perfluoroaliphatic, perfluorocycloaliphatic or perfluoroalkoxy group, having at least 6 carbon atoms and at least 11 fluorine atoms, and $R^1_f$ indicates that the group is fully fluorinated, that is, all hydrogen atoms in the group are substituted with fluorine atoms; and (b) about 20% to 90% by weight of methyl methacrylate.

2. The cladding composition according to claim 1 further comprising a free radical initiator.

3. The cladding composition according to claim 2 further comprising a vinyl-substituted adhesion promoter.

4. The cladding composition according to claim 1, wherein the fluorine-containing monomer (A) is selected from the group consisting of 1,1-dihydroperfluorobutoxyisoproxyisopropyl methacrylate, 1,1-dihydroperfluorobutoxyisopropoxyisopropoxyisopropyl methacrylate, and perflurocyclohexylmethoxy-2-propoxy-1,1-dihydro-2-propyl methacrylate.

5. The cladding composition according to claim 1, wherein the fluorine-containing monomer (B) is selected from the group consisting of 1,1-dihydroperfluorocyclohexylmethyl methacrylate, 1,1-dihydroperfluorooctyl methacrylate, 1,1-dihydroperfluorobutoxyisopropoxyisopropyl methacrylate, 1,1-dihydroperflurobutoxyisopropoxyisopropoxyisopropyl methacrylate, and perflurocyclohexylmethoxy-2-propoxy-1,1-dihydro-2-propyl methacrylate.

6. The cladding composition according to claim 1, wherein the fluorine-containing monomer (A) is 1,1-dihydroperfluorobutoxyisopropoxyisopropyl methacrylate, and the fluorine-containing monomer (B) is 1,1-dihydroperfluorooctyl methacrylate.

7. The cladding composition according to claim 1, wherein the fluorine-containing monomer (A) is 1,1-dihydroperfluorobutoxyisopropoxyisopropyl methacrylate, and the fluorine-contaning monomer (B) is 1,1-dihydroperfluorocyclohexylmethyl methacrylate.

8. The cladding composition according to claim 1, wherein the fluorine-containing monomer (A) is 1,1-dihydroperfluorobutoxyisopropoxyisopropyl methacrylate.

9. The cladding composition according to claim 3, wherein the fluorine-containing monomer (A) is 1,1-dihydroperfluorobutoxyisopropoxyisopropyl methacrylate, and the vinyl-substituted adhesion promoter is methacrylic acid.

10. The cladding composition according to claim 3, wherein the fluorine-containing monomer (A) is 1,1-dihydroperfluorobutoxyisopropoxyisopropyl methacrylate, and the vinyl-substituted adhesion promoter is acrylic acid.

11. The cladding composition according to claim 3, wherein the refractive index is in the range of 1.37 to 1.47.

12. An optical fiber comprising a core coated with a cladding composition having a lower refractive index than the core, said cladding composition comprising:
(a) about 10% to 80% by weight of polymerizable fluorine-containing methacrylic monomer (A) or a mixture of polymerization fluorine-containing methacrylic monomer (A) and fluorine-containing methacrylic monomer (B), and monomer (A) can be represented by the formula

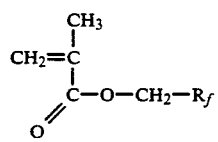 Monomer (A)

wherein $R_f$ is a perfluorocycloaliphatic or a perfluoroalkoxy group, having at least 6 carbon atoms and at least 11 florine atoms, and $R_f$ indicates that the group is fully fluorinated, that is, all hydrogen atoms in the group are substituted with fluorine atoms, and monomer (B), if present, is present in an amount of up to 50% by weight of the mixture and can be represented by the formula

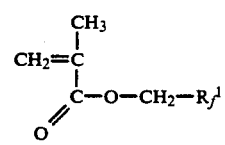 Monomer (B)

wherein $R^1_f$ is a perfluoroaliphatic, perfluorocycloaliphatic or perfluoroalkoxy group, having at least 6 carbon atoms and at least 11 fluorine atoms, and $R^1_f$ indicates that the group is fully fluorinated, that is, all hydrogen atoms in the group are substituted with fluorine atoms; and (b) about 20% to 90% by weight of methyl methacrylate.

13. The optical fiber according to claim 12 further comprising a free radical initiator.

14. The optical fiber according to claim 13 further comprising a vinyl-substituted adhesion promoter.

15. The optical fiber according to claim 12, wherein the fluorine-containing monomer (A) is selected from the group constiting of 1,1-dihydroperfluorobutoxyisopropoxyisopropyl methacrylate, 1,1-dihydroperfluorobutoxyisopropoxyisopropoxyisopropyl methacrylate, and perflurocyclohexylmethoxy-2-propoxy-1,1-dihydro-2-propyl methacrylate.

16. The optical fiber according to claim 12, wherein the fluorine-containing monomer (B) is selected from the group constiting of 1,1-dihydroperfluorocyclohexylmethyl methacrylate, 1,1-dihydroperfluorooctyl methacrylate, 1,1-dihydroperfluorobutoxyisopropoxyisopropyl methacrylate, 1,1-dihydroperflurobutoxyisopropoxyisopropoxyisopropyl methacrylate, and perflurocyclohexylmethoxy-2-propoxy-1,1-dihydro-2-propyl methacrylate.

17. The optical fiber according to claim 12, wherein the fluorine-containing monomer (A) is 1,1-dihydroperfluorobutoxyisopropoxyisopropyl methacrylate, and the fluorine-containing monomer (B) is 1,1-dihydroperfluorooctyl methacrylate.

18. The optical fiber according to claim 12, wherein the fluorine-containing monomer (A) is 1,1-dihydroperfluorobutoxyisopropoxyisopropyl methacrylate, and the fluorine-containg monomer (B) is 1,1-dihydroperfluorocyclohexylmethyl methacrylate.

19. The optical fiber according to claim 12, wherein the fluorine-containing monomer (A) is 1,1-dihydroperfluorobutoxyisopropoxyisopropyl methacrylate.

20. The optical fiber according to claim 15, wherein the fluorine-containing monomer (A) is 1,1-dihydroperfluorobutoxyisopropoxyisopropyl methacrylate, and the vinyl-substituted adhesion promoter is methacrylic acid.

21. The optical fiber according to claim 15, wherein the fluorine-containing monomer (A) is 1,1-dihydroperfluorobutoxyisopropoxyisopropyl methacrylate, and the vinyl-substituted adhesion promoter is acrylic acid.

22. The optical fiber according to claim 12, wherein the fiber core is selected from the group consisting of polymethylmethacrylate, polyfluoroacrylics, polystyrene, polycarbonate, amorphous polyolefins, and glass.

23. The optical fiber according to claim 22, wherein the refractive index of the cladding composition is in the range of 1.37 to 1.47.

* * * * *

UNITED STATES PATENT AND TRADEMARK OFFICE
CERTIFICATE OF CORRECTION

PATENT NO. : 5,148,511

DATED : September 15, 1992

INVENTOR(S) : Savu et al.

Page 1 of 2

It is certified that error appears in the above-identified patent and that said Letters Patent is hereby corrected as shown below:

Col. 3, line 5, In Monomer B formula "$R_f^1$" should be --$R^1_f$--.

Col. 3, line 9, Insert --perfluorocycloaliphatic-- after "perfluoroaliphatic".

Col. 3, line 28, In the formula "$R_f^1$" should be --$R^1_f$--.

Col. 4, line 23, In Monomer B formula "$R_f^1$" should be --$R^1_f$--.

Col. 4, line 46, In the formula "$R_f^1$" should be --$R^1_f$--.

Col. 5, line 32, In the formula "$R_f^1$" should be --$R^1_f$--.

Col. 6, line 19, "poymethylmethacrylate" should be --polymethylmethacrylate--.

Col. 8, line 25, "coreesponding" should be --corresponding--.

Col. 12, line 62, 'alternations" should be --alterations--.

Col. 12, line 63, Delete --be-- after "will"

Col. 13, line 29, In Monomer B formula "$R_f^1$" should be --$R^1_f$--.

Col. 14, line 38, "florine" should be --Fluorine--.

UNITED STATES PATENT AND TRADEMARK OFFICE
CERTIFICATE OF CORRECTION

PATENT NO. : 5,148,511
DATED : September 15, 1992
INVENTOR(S) : Savu et al

It is certified that error appears in the above-indentified patent and that said Letters Patent is hereby corrected as shown below:

Col. 14, line 49, In Monomer B formula "$R_f^1$" should be --$R^1_f$--.

Col. 15, line 6, "constiting" should be --consisting--

Signed and Sealed this

Twenty-sixth Day of October, 1993

Attest:

BRUCE LEHMAN

Attesting Officer

Commissioner of Patents and Trademarks